(12) United States Patent
Gocho et al.

(10) Patent No.: US 6,955,839 B2
(45) Date of Patent: Oct. 18, 2005

(54) LAMINATED COMPOSITE, INFORMATION RECORDING MEDIUM, AND MEMBER OF IMPARTING FORGERY-PREVENTING CHARACTERISTIC

(75) Inventors: Satoshi Gocho, Tokyo (JP); Atsushi Kijima, Tokyo (JP); Akira Kubo, Tokyo (JP); Noriyuki Ito, Tokyo (JP); Naoaki Shindo, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/986,913

(22) Filed: Nov. 13, 2001

(65) Prior Publication Data

US 2002/0081400 A1 Jun. 27, 2002

Related U.S. Application Data

(63) Continuation of application No. PCT/JP00/03292, filed on May 23, 2000.

(30) Foreign Application Priority Data

May 24, 1999 (JP) .......................................... 11-143998

(51) Int. Cl.$^7$ .............................................. C09K 19/00
(52) U.S. Cl. ................. 428/1.2; 283/904; 235/380; 349/177; 430/20; 428/1.1; 428/40.1; 428/41.7; 428/1.3; 428/1.31; 359/485
(58) Field of Search ......................... 235/380; 283/904, 283/901, 57, 72, 90; 349/117; 428/1.1, 1.2, 40.1, 41.7, 1.3, 1.31; 430/20; 359/485, 437, 462, 464, 558, 577

(56) References Cited

U.S. PATENT DOCUMENTS

| 4,893,906 A | 1/1990 | Makow |
| 5,307,113 A | 4/1994 | Egawa |
| 5,438,403 A | 8/1995 | Hoshino et al. |
| 5,683,774 A * | 11/1997 | Faykish et al. ............ 428/40.1 |

(Continued)

FOREIGN PATENT DOCUMENTS

| EP | 0231856 | 8/1987 |
| EP | 568185 | 11/1993 |
| EP | 0 568 185 A2 | 11/1993 |
| EP | 0689065 | 12/1995 |

(Continued)

OTHER PUBLICATIONS

PCT Notification Of Transmittal Of Copies Of Translation Of The International Preliminary Examination Report; PCT/JP2000/003292; May 23, 2000.
European Search Report; EP 32806; 00927850.8–2304–JP0003292; Toppan Printing Co, Ltd.
Shibaev V P et al: "Thermotropic Liquid–Crystalline Polymers: 14* Thermo–Recording On Liquid–Crystalline Polymers With The Aid Of A Laser Beam"; XP000607920; Polymer Communications, London, GB; vol. 24, no. 1; Dec. 1, 1983, pp. 364–365.

*Primary Examiner*—Rena Dye
*Assistant Examiner*—Tamra L. Dicus

(57) ABSTRACT

According to the present invention, there is provided a laminated composite including an optical layer having a light reflectivity, and a latent image formation layer containing a liquid crystalline polymer material and provided on one of major surfaces of the optical layer, wherein the latent image formation layer includes at least one oriented portion in an orientation state and at least one non-oriented portion in a non-orientation state, and the oriented and non-oriented portions constitute a latent image which is unrecognizable by a direct visual observation and recognizable by a visual observation through a polarizing member. Also, according to the present invention, there is provided an information recording medium and a member of imparting a forgery-preventing characteristic including such a latent image formation layer.

29 Claims, 5 Drawing Sheets

U.S. PATENT DOCUMENTS

| | | | |
|---|---|---|---|
| 5,800,950 A * | 9/1998 | Hirao et al. | 430/1 |
| 5,999,280 A * | 12/1999 | Huang | 359/2 |
| 6,110,864 A * | 8/2000 | Lu | 503/227 |
| 6,111,969 A * | 8/2000 | Babb | 359/495 |
| 6,124,970 A * | 9/2000 | Karassev et al. | 359/485 |
| 6,284,337 B1 * | 9/2001 | Lorimor et al. | 428/40.1 |
| 6,531,230 B1 * | 3/2003 | Weber et al. | 428/480 |
| 6,734,936 B1 * | 5/2004 | Schadt et al. | 349/117 |

FOREIGN PATENT DOCUMENTS

| | | | |
|---|---|---|---|
| EP | 911758 | 4/1999 | |
| EP | 0 911 758 A2 | 4/1999 | |
| EP | 1028359 | 8/2000 | |
| GB | 2146787 | 4/1985 | |
| JP | 2-41927 | 3/1990 | |
| JP | 3-118198 | 5/1991 | |
| JP | 03118198 A * | 5/1991 | B42D/15/10 |
| JP | 0 435 029 A2 | 7/1991 | |
| JP | 6-138803 | 5/1994 | |
| JP | 6-286369 | 10/1994 | |
| JP | 8-190335 | 7/1996 | |
| JP | 8-276659 | 10/1996 | |
| JP | 11-3412 | 1/1999 | |
| JP | 11-5273 | 1/1999 | |
| JP | 8-276659 | 10/1999 | |
| JP | 11-277957 | 10/1999 | |

* cited by examiner

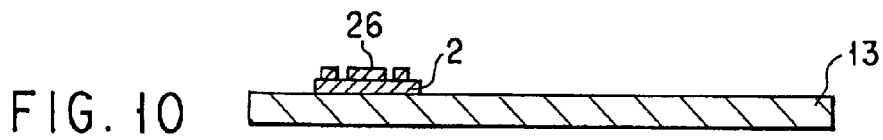
FIG. 10
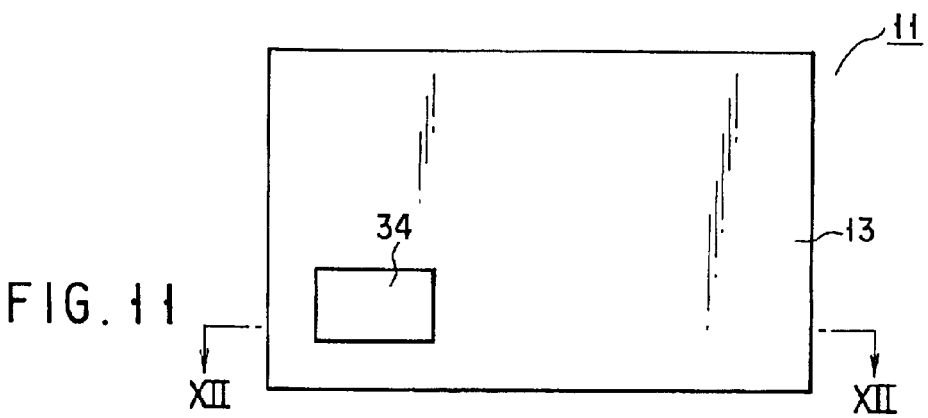
FIG. 11
FIG. 12
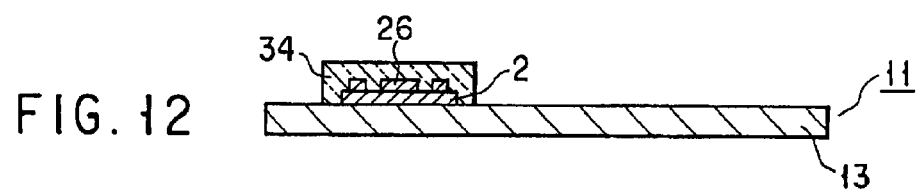
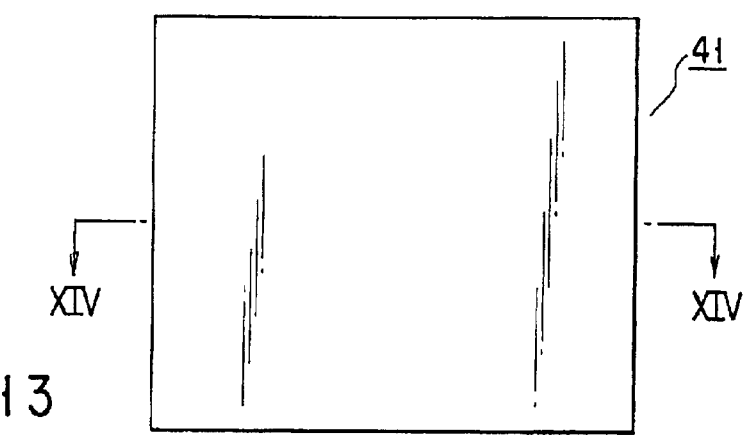
FIG. 13
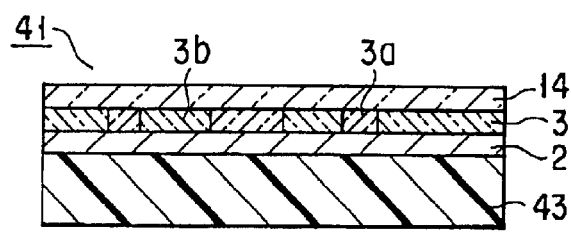
FIG. 14

LAMINATED COMPOSITE, INFORMATION RECORDING MEDIUM, AND MEMBER OF IMPARTING FORGERY-PREVENTING CHARACTERISTIC

CROSS-REFERENCE TO RELATED APPLICATIONS

This is a Continuation Application of PCT Application No. PCT/JP00/03292, filed May 23, 2000, which was not published under PCT Article 21(2) in English.

This application is based upon and claims the benefit of priority from the prior Japanese Patent Application No. 11-143998, filed May 24, 1999, the entire contents of which are incorporated herein by reference.

BACKGROUND OF THE INVENTION

1. Field of the Invention

The present invention relates to a laminated composite, an information recording medium, and a member of imparting a forgery-preventing characteristic, and more particularly, to a laminated composite which can be used in discriminating an information recording medium between genuine one and a counterfeit by using a latent image, an information recording medium which can be discriminated between a genuine one and a counterfeit by using the latent image, a member of imparting, to an information recording medium, a forgery-preventing characteristic which enable discrimination of the information recording medium between a genuine one and a counterfeit.

2. Description of the Related Art

Conventionally, as techniques for preventing forgery of information recording mediums such as credit cards, securities, and certificates, methods using a latent image are known. The methods employ, for example, 1) A picture drawn by parallel lines: a latent image such as a hidden letter is drawn in a space between the parallel lines and the latent image can be visualized by concealing the parallel lines, and 2) A decomat: a latent image is formed by a printing technique using a transparent ink medium which contains a filler and the latent image can be visualized by rubbing the printed portion with a pencil so as to allow a powder from a lead of the pencil to attach onto the printed portion.

However, in methods 1) and 2), the latent image is legible if carefully observed. Thus, these methods 1) and 2) are used for pleasure rather than as a practical forgery-preventing technique.

As a more practical forgery-preventing technique, the following methods are known:

3) A method in which a latent image is formed by use of an irreversible thermochromic ink which is white or colorless and transparent and develops a color by application of heat.

4) A method in which a latent image is formed by a printing technique using a white ink which contains a filler such as titanium oxide harder than a metal, and the latent image can be visualized by rubbing the printed portion with a coin or the like.

However, the method 3) requires a heating device to visualize the latent image. In addition, once the latent image is visualized in the method 3), it cannot be returned to an invisible state. On the other hand, in the method 4), although the image such as a letter is rendered invisible by forming a mat-like varnish layer thereon, once the latent image is visualized, it cannot be returned to an invisible state. Therefore, the methods 3) and 4) can be used only once.

As a technique capable of repeating visualization and nonvisualization of a latent image, the following techniques are known.

5) A method in which a latent image is formed or a image is concealed by using a reversible thermochromic ink, which reversibly develops and loses a color thereof by application of heat and returns to its original state if left alone for a while.

6) A method in which a latent image is formed by using a photochromic ink, which is capable of developing a color by light irradiation, particularly, by ultraviolet irradiation, as the white or colorless and transparent ink; and 7) A method in which a latent image is formed by using an organic type or an inorganic type of fluorescent ink, which is capable of developing a color by ultraviolet irradiation, as the white or colorless and transparent ink.

However, the thermochromic ink used in the method 5) has a problem that the resistance thereof, particularly, the heat resistance, is low. The photochromic ink used in the method 6) also has a problem that the resistance thereof, particularly, the light stability is low.

When an organic fluorescent ink is used in the method 7), sufficient luminescence can be obtained simply by adding an extremely small amount of organic phosphor to a printing ink. However, the organic phosphor is low in light stability. Furthermore, when an inorganic fluorescent ink is used in the method 7), a large amount of inorganic phosphor (about 10–20%) need be added to a printing ink in order to obtain sufficient luminescence. Due to this, the latent image formed by using the inorganic fluorescent ink is apt to be legible by visual observation. Thus, the design of the latent image must be carefully made.

As mentioned above, methods 5)–7) are limited in application because of the resistance of ink.

As a forgery-preventing technique capable of repeating visualization and nonvisualization of the latent image, the following methods are known:

8) A method in which a latent image is formed by use of dots of a screen and moire fringes of parallel lines. In this method, the latent image is formed by partly changing the pitch of the dots or the pitch and/or angle of the parallel lines. Thereafter, a transparent film having regularly arranged dots or parallel lines thereon is overlaid on the latent image to visualize the latent image.

According to the method 8), the latent image can be visualized simply by using the transparent film. Thus, the visualization and non-visualization of the latent image can be easily repeated. In addition, this methods is free from the problem of resistance, so that application of the method is not limited. However, the method 8) has a problem that a complicated latent image cannot be obtained.

As another forgery-preventing method which can repeat the visualization and non-visualization of a latent image, the following method is known.

9) A method in which a latent image is formed by using a magnetic ink. In this method, a latent image is formed by partly magnetizing a magnetic layer which has a sufficiently high coersive force (about 300 Oe or more, or about 24 kA/m or more) enough to perform a magnetic recording, and the latent image is visualized by sprinkling an iron powder over the magnetic layer. However, in this method 9), a latent image can be easily rewritten and forged. In addition, the step of visualizing the latent image is complicated and requires a specific detection apparatus.

As another forgery-preventing technique which can repeat the visualization and nonvisualization of a latent image, the following method is known:

10) A method in which a latent image is formed by using an ink capable of absorbing infrared rays and a layer capable of transmitting the infrared rays and not transmitting visible light is formed on the latent image. However, this method requires an infrared camera etc. to visualize the latent image. Accordingly, the method has a problem that the apparatus inevitably increases in size. Another method is also known using a white or colorless ink (IV ink) absorbing infrared rays and not absorbing visible light. However, this method also requires an infrared camera etc.

According to the methods 9) and 10), it is possible to repeat the visualization and nonvisualization of a latent image and form a complicated latent image. In addition, there is no limitation in application due to resistance of the latent image. However, the methods 9) and 10) require a specific apparatus to visualize the latent image, as mentioned above.

BRIEF SUMMARY OF THE INVENTION

The conventional forgery-preventing techniques using a latent image have various problems as mentioned above.

An object of the present invention is to provide a forgery-preventing technique capable of repeating visualization and nonvisualization of a latent image, forming a complicated latent image having a sufficient resistance, easily discriminating an article between a genuine one and a counterfeit, and visualizing the latent image without using a large scale apparatus.

Another object of the present invention is to provide a laminated composite which can be employed in the forgery preventing technique, an information recording medium to which forgery-preventing characteristic is imparted by the forgery preventing technique, and a member of imparting the forgery-preventing characteristic to an information recording medium.

According to a first aspect of the present invention, there is provided a laminated composite comprising an optical layer having a light reflectivity, and a latent image formation layer containing a liquid crystalline polymer material and provided on one of major surfaces of the optical layer, wherein the latent image formation layer comprises at least one oriented portion in an orientation state and at least one non-oriented portion in a non-orientation state, and the at least one oriented portion and the at least one non-oriented portion constitute a latent image which is unrecognizable by a direct visual observation and recognizable by a visual observation through a polarizing member.

According to a second aspect of the present invention, there is provided an information recording medium comprising a light reflective substrate with a light reflective surface, and a latent image formation layer containing a liquid crystalline polymer material and provided on the light reflective surface, wherein the latent image formation layer comprises at least one oriented portion in an orientation state and at least one non-oriented portion in a non-orientation state, and the at least one oriented portion and the at least one non-oriented portion constitute a latent image which is unrecognizable by a direct visual observation and recognizable by a visual observation through a polarizing member.

According to a third aspect of the present invention, there is provided a member of imparting forgery-preventing characteristic comprising a base layer, an optical layer provided on one of major surfaces of the base layer and having a light reflectivity, and a latent image formation layer containing a liquid crystalline polymer material and provided on the optical layer, wherein the latent image formation layer comprises at least one oriented portion in an orientation state and at least one non-oriented portion in a non-orientation state, and the at least one oriented portion and the at least one non-oriented portion constitute a latent image which is unrecognizable by a direct visual observation and recognizable by a visual observation through a polarizing member.

Note that, the term of "laminated composite" used herein includes all laminated structures formed by laminating a plurality of layers. The term "information recoding medium" used herein includes all mediums in which data are recorded. In particular, it refers to an information recording medium such as a credit card, a security and a certificate, which need to be discriminated between a genuine one and a counterfeit. Furthermore, the term "a member of imparting forgery-preventing characteristic" refers to a member of imparting forgery-preventing characteristic to the information recording medium and includes adhesive-backed sheets and self-adhesive seals (or self-adhesive stickers).

The phrase "be in an orientation state" refers to a state in which main chains or side chains of a polymeric liquid material, or both of them are orientationally arranged in a single direction substantially parallel to the main surface of the latent image formation layer to the extent that a latent image can be fully recognized under visual observation through a polarizing member. Furthermore, the phrase "be in a nonorientation state" refers to a state in which the orientation degree of the main chain and side chain of the liquid crystalline polymer material is low or the liquid crystalline polymer material per se is not present. Therefore, under the nonorietation state, a latent image cannot be visually observed through a polarizing member.

As described in the above, a latent image-forming layer having the oriented portion and the non-oriented portion is combined with an optical layer or a light reflective substrate in the present invention. The oriented portion and non-oriented portion compose the latent image. Generally, they differ only in orientation state of the main chains or side chains of molecules of the liquid crystalline polymer material or both of them. The difference in orientation state between the first portion and the second portion cannot be distinguished by direct visual observation. However, if a polarizing member is used, the difference between them can be visually observed as difference in intensity of reflected light. In other words, since a relatively high contrast is produced between the oriented portion and the non-oriented portion, the latent image can be easily recognized. In brief, the present invention enables discrimination of an article between a genuine one and a counterfeit without using a large apparatus for visualizing a latent image.

In the present invention, the latent image can be visualized without changing the state of a latent image. Thus, the visualization and nonvisualization of the latent image can be repeated. Furthermore, the latent image formation layer made of a liquid crystalline polymer material has a sufficient resistance.

The different orientation state mentioned above can be produced by extending a general polymer film such as a polypropylene film. However, such a film is thick (usually 3 μm or more), so that the film is extremely limited in application range. In addition, it is extremely hard to form a complicated latent image simply by extending such a thick film.

In contrast, when the liquid crystalline polymer material is used, it is possible to form the latent image formation layer sufficiently thin. It is further possible to form a complicated latent image if heat and pressure are applied. For example, when a thermotropic liquid crystalline polymer material is used as the liquid crystalline polymer material, an extremely complicated latent image can be formed by use of a thermal head or the like. The resultant latent image is extremely stable at a temperature less than a glass transition temperature of the thermotropic liquid crystalline polymer material. Likewise, since a liquid crystalline polymer material is used in the latent image formation layer in the present invention, extremely a wide range of application can be made.

In the present invention, it is necessary to arrange a light reflective surface at the rear surface side of the latent image formation layer as viewed from an observer. The light reflective surface may either a surface of the optical layer having light reflectivity or one of light reflective surfaces of the light reflective material. Note that the term "optical layer" used herein refers to a layer having light reflectivity such as a specular reflection layer or an OVD (Optical Variable Device) layer. Furthermore, the "light reflective substrate" includes a single-layered structure and a laminated structure of a information-recorded substrate and an optical layer.

In the present invention, the optical layer is not particularly limited as long as the layer has light reflectivity, like a specular reflection layer and an OVD layer. The optical layer may have both light reflectivity and light transmissivity. In the case where the optical layer is a specular reflection layer, an OVD layer may be further arranged either on the latent image formation layer or between the specular reflection layer and the latent image formation layer.

It is preferable that a protection layer having a light transmissibility and protecting the latent image formation layer is disposed on the latent image formation layer. In particular, when the protection layer has a light scattering characteristic, it is more difficult to recognize the latent image under direct visual observation.

The information recording medium having the aforementioned latent image formation layer etc. can be manufactured by laminating the latent image formation layer on, for example, a light reflective substrate of a single-layered structure. Alternatively, the information recording medium having the latent image formation layer etc. can be manufactured by laminating the latent image formation layer on the light reflective substrate having a laminated structure of a information-recorded substrate and an optical layer. Furthermore, the information recording medium having the aforementioned information recording medium etc. may be formed by sequentially laminating the optical layer and latent image formation layer on the information-recorded substrate. Moreover, the information recording medium having the aforementioned information recording medium etc. may be formed by laminating a laminated structure of the optical layer and latent image formation layer on the information-recorded substrate. Note that the latent image may be formed in any step after the latent image formation layer is formed.

As mentioned above, the information recording medium can be manufactured in various methods. In most cases, employed is the method of stacking the laminated structure of the optical layer and the latent image formation layer on a information-recorded substrate. When this method is employed, it is possible to use a member of imparting forgery-preventing characteristic having a laminated structure of a base layer, an optical layer, and a latent image formation layer. When such a member is used, the information recording medium can be manufactured quite simply.

The base layer used herein is preferably an adhesive layer. In this case, the member of imparting forgery-preventing characteristic can be transferred onto the information-recorded substrate by heat sealing. Alternatively, a sticky layer may be attached onto the base layer at a rear side of the surface having the optical layer provided thereon. Note that the term "adhesive layer" used herein refers to the layer which requires heat for bonding, whereas the term "sticky layer" used herein is the layer which is capable of bonding without heat.

When the latent image formation layer is laminated on the light reflective substrate of a single-layered structure or when the latent image formation layer is laminated on the light reflective substrate having a laminated structure of the information-recorded substrate and the optical layer, it is possible to employ a member of imparting forgery-preventing characteristic, which is formed by laminating the protection layer, latent image formation layer, and adhesive layer sequentially on the base layer. In this case, the base layer need to be removable from the protection layer.

It is preferable that a release layer such as a release paper or a separate paper is releasably disposed on the adhesive layer and the sticky layer. The release layer thus disposed can prevent foreign matters from attaching onto the adhesive layer and the sticky layer before the member of imparting forgery-preventing characteristic is transferred to the information-recorded substrate. At the same time, by the presence of the release layer, the handling of the member of imparting forgery-preventing characteristic becomes easier.

In the present invention, the polarizing member may be either of a polarizing film and a polarizing board. Furthermore, a circularly polarizing member such as a circularly polarizing film can be used as the polarizing member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a schematic sectional view of a structure obtained by using the apparatus shown in FIG. 9;

FIG. 11 is a schematic plan view of an information recording medium obtained by further adding a light-scattering protection layer to the structure shown in FIG. 10.

FIG. 12 is a sectional view taken along the line XII—XII of the information recording medium of FIG. 11;

FIG. 13 is a schematic plan view of a sheet according to a third embodiment of the present invention;

FIG. 14 is a sectional view taken along the line XIV—XIV of the sheet shown in FIG. 13;

DETAILED DESCRIPTION OF THE INVENTION

Figure 1:
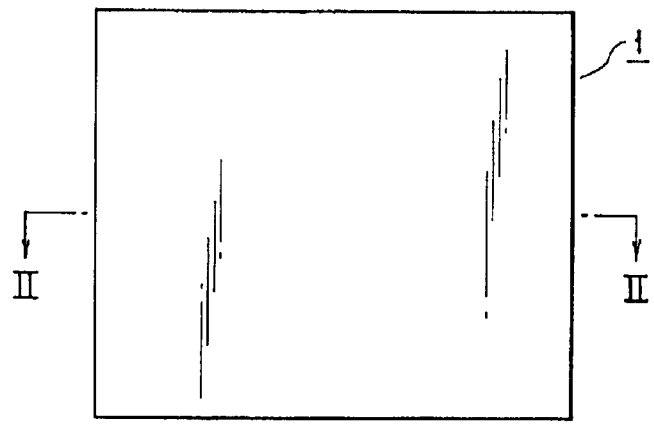
FIG. 1 is a plan view schematically showing a laminated composite according to a first embodiment of the present invention.

The present invention will be explained more in detail with reference to the accompanying drawings. Note that the same reference numerals denote the similar structural elements and the overlapped description is omitted.

Figure 2:
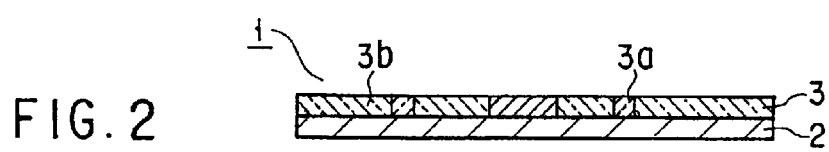
FIG. 2 is a cross-sectional view taken along the line II—II of the laminated composite shown in FIG. 1.

FIG. 1 is a schematic plan view showing a laminated composite according to a first embodiment of the present invention. FIG. 2 is a cross sectional view taken along the line II—II of the laminated composite in FIG. 1.

The laminated composite 1 shown in FIGS. 1 and 2 has a laminated structure of a specular reflection layer 2 and a latent image formation layer 3. The latent image formation layer 3 contains a liquid crystalline polymer material and has an oriented portion 3a and a non-oriented portion 3b. In the oriented portion 3a, the main chains or the side chains of the polymer liquid crystal molecules are oriented in a single direction virtually parallel to the surface of the latent image formation layer 3, whereas, in the non-oriented portion 3a, the main chains and side chains of the liquid crystalline polymer molecules are not oriented. The oriented portion 3a and the non-oriented portion 3b form a latent image. When the latent image is visually observed not through a polarizing film, it is impossible or difficult to recognize the latent image.

Figure 3:
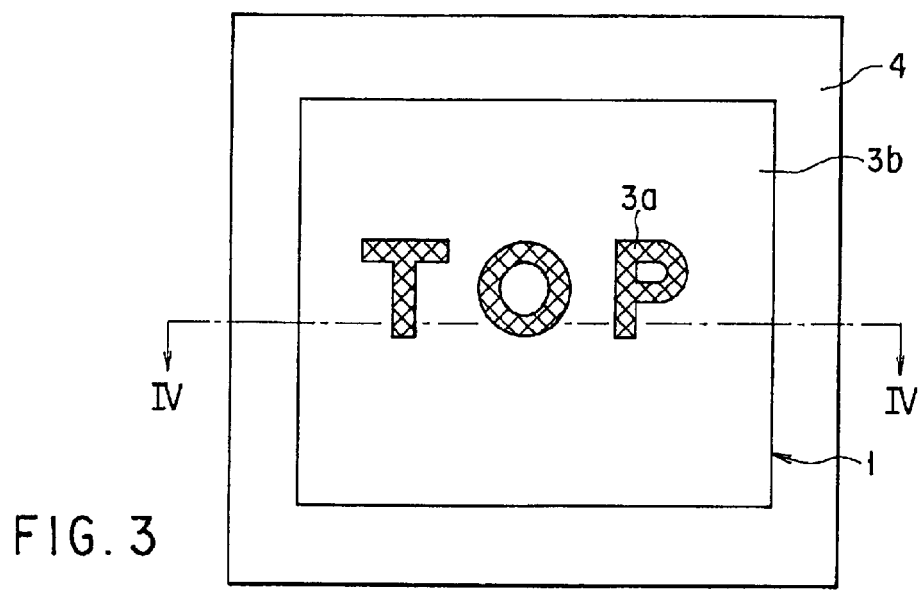
FIG. 3 is a plan view of the laminated composite shown in FIGS. 1 and 2 viewed through a polarizing film which is arranged at the side closer to an observer.
Figure 4:
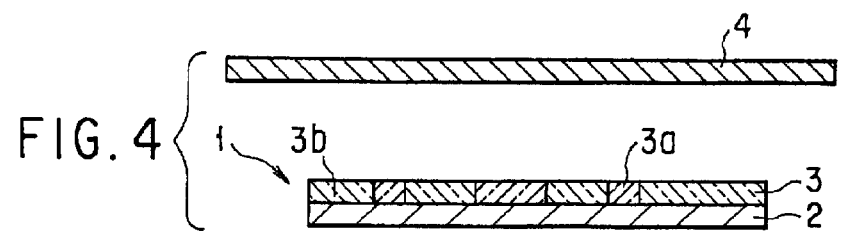
FIG. 4 is a cross-sectional view taken along the line IV—IV of the laminated composite and the polarizing film shown in FIG. 3.

FIG. 3 is a plan view of the laminated composite 1 shown in FIGS. 1 and 2, viewed through a polarizing film 4 arranged at the side closer to an observer. FIG. 4 is a cross-sectional view taken along the IV—IV line of the laminated composite 1 and the polarizing film 4 shown in FIG. 3. Hereinafter, in all structures having the laminated structure of a layer having light reflectivity such as the specular reflection layer 2 and the latent image formation layer 3, the side close to the latent image formation layer 3 will be referred to as an "observer side".

When the polarizing film 4 is arranged at the observer side of the laminated composite 1, a relatively strong contrast is produced between the oriented portion 3a and the non-oriented portion 3b. As a result, the latent image is visualized. More specifically, the latent image of the laminated composite 1 can be recognized as visually observed through the polarizing film 4. This principle will be explained with reference to FIG. 5.

Figure 5:
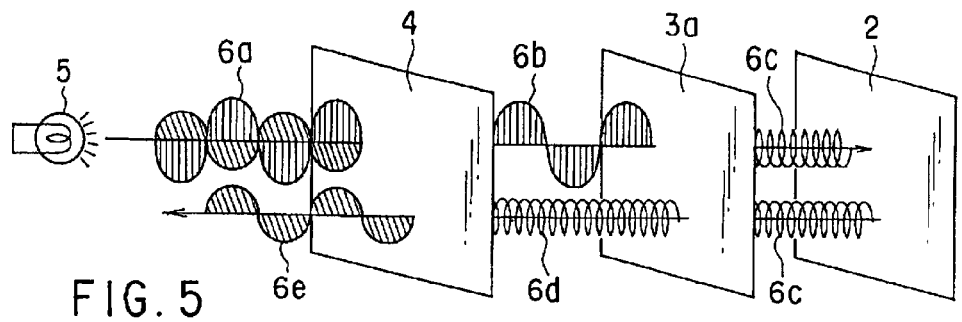
FIG. 5 is a schematic view explaining the principle of the present invention.

FIG. 5 is a schematic view for explaining the principle of the present invention. FIG. 5 shows behavior of light transmitting through the oriented portion 3a. Only the oriented portion 3a is depicted in the latent image formation layer 3. In FIG. 5, the specular reflection layer 2 forming the laminated composite 1 is drawn at a distance from the oriented portion 3a of the latent image formation layer 3. A polarizing film 4 and a light source 5 are arranged sequentially toward the observer side of the laminated composite 1.

As shown in FIG. 5, white light 6a from a light source 5, when passes through the polarizing film 4, is converted into linearly polarized light 6b. Of the linearly polarized light 6b, a light component transmitting through the oriented portion 3a of the latent image formation layer 3 is converted into elliptically polarized light 6c. The elliptically polarized light 6c is reflected by a specular reflection layer 2, passes through the oriented portion 3a, and changes to elliptically polarized light 6d. The elliptically polarized light 6d once again passes through the polarizing film 4 and changes to linearly polarized light 6e, which serves as one component of display light.

On the other hand, of the linearly polarized light 6b, a light component passing through the non-oriented portion 3b is reflected by the specular reflection layer 2 without being elliptically polarized. The linearly polarized light 6b reflected by the specular reflection layer 2 once again passes through the non-oriented portion 3b of the latent image formation layer 3 without being elliptically polarized, and further passes through the polarizing film 4.

The light component passing through the oriented portion 3a and entering the polarizing film 4 is elliptically polarized, whereas the light component passing through the non-oriented portion 3a and entering the polarizing film 4 is linearly polarized. As a result, a relatively strong contrast is produced between the oriented portion 3a and the non-oriented portion. It is therefore possible to easily recognize a latent image.

The laminated composite 1 may be used as information recording medium.

Figure 6:
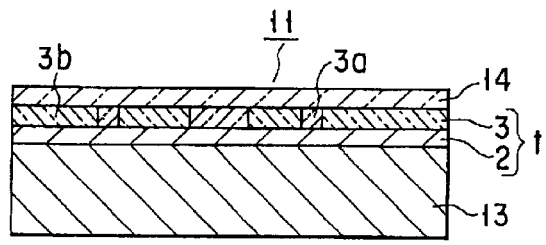
FIG. 6 is a schematic sectional view of an information recording medium according to a first embodiment of the present invention.

FIG. 6 is a schematic sectional view of an information recording medium according to the first embodiment of the present invention. The information recording medium 11 shown in FIG. 6 has a laminated structure on an information-recorded substrate 13. The laminated structure is formed by sequentially laminating a specular reflection layer 2, a latent image formation layer 3, and a protection layer 14. Since such an information recording medium 11 has the laminated composite 1 mentioned above, it has a high forgery-preventing characteristics.

Now, each of the structure elements of the laminated composite 1 and the information recording medium 11 will be explained.

The information-recorded substrate 13 is a substrate for an information recording medium including credit cards, securities, and certificates, which requires to be discriminated between a genuine one and a counterfeit. Generally, some data such as letters and figures are recorded on at least one of the main surfaces of the information-recorded substrate 13. As the information-recorded substrate 13, use may be made of a synthetic resin film such as polyethylene terephthalate, polyvinyl chloride, polyester, polycarbonate, polymethyl methacrylate or polystyrene; a natural resin film; synthetic paper; paper; or a glass plate. Furthermore, a composite formed by combining them may be used as the information-recorded substrate 13.

Various layers may be disposed on the information-recorded substrate 13. Therefore, the information-recorded substrate 13 preferably has a sufficient resistance to the processes for forming the various layers. More specifically, the information-recorded substrate 13 preferably has a sufficient strength and heat resistance. In addition, the thickness and shape of the information-recorded substrate 13 vary depending upon a final product form of the information recording medium 11, and not particularly limited.

The specular reflection layer 2 may not be particularly limited as long as it has mirror reflectivity. An evaporation film or a sputtering film made of a metal and alloy may be used. As the metal to be used in the specular reflection layer 2, there are Al, Cr, Ni, Cu, Ag and the like. As the alloy to be used in the specular reflection layer 2, there are Pt—Rh, Ni—Cr and the like.

The latent image formation layer 3 contains a liquid crystalline polymer material. Preferably, it may consist essentially of a liquid crystalline polymer material. As the liquid crystalline polymer material, a thermotropic liquid crystalline polymer material is preferably used. More preferably, a thermotropic liquid crystalline polymer material having a glass transition temperature of about 80–200° C. should be used. Examples of the thermotropic liquid crystalline polymer material include liquid crystalline polymer materials exhibiting thermotropic characteristics, such as a polyester copolymer, polyether, polycarbonate, polyisocianate, and polyglutamate.

A colored layer containing a transparent color ink may be disposed between the specular reflection layer 2 and the latent image formation layer 3.

The protection layer 14 is not an essential structural element, but preferably used in the information recording medium 11. The protection layer 14 can prevent the latent image formation layer 3 from being scratched. Furthermore, the protection layer thus disposed can prevent a latent image from being viewed through traces, which are produced by heat or pressure applied at the time the latent image is formed in the latent image formation layer 3.

As the material of the protection layer 14, a thermoplastic resin, thermosetting resin, ultraviolet or electron radiation curing resin hitherto widely used, may be employed singly or in the form of a mixture. Examples of these resins include acrylic resins, urethane-based resins, vinyl chloride resin/vinyl acetate copolymer resin, polyester-based resins, melamine-based resins, epoxy-based resins, polystyrene-based resins, polyimide-based resins, and the like.

To prevent traces from being produced by a thermal head or the like at the time a latent image is formed, the protection layer 14 may contain a curing agent for cross-linking a resin; waxes such as polyethylene wax, carnauba wax, and silicone wax; extender pigments such as calcium carbonate, zinc stearate, silica, alumina and talc; or fat and oils such as silicone oil, within the range which will not deteriorate transparency.

The protection layer 14 preferably has light scattering properties. In this case, it is possible to effectively prevent a latent image from being visually observed through the traces.

As the polarizing film 4, use may be made of a PVA-iodine type polarizing film formed by making a PVA extension film absorb an iodine, a dichroic dye type polarizing film, a metal or a metal compound containing type polarizing film, and a polymeric polycrystalline type polarizing film such as a polyen type polarizing film. Furthermore, a circularly polarizing film may be used as the polarizing film 4. The circularly polarizing film typically used is one formed by overlaying a ¼λ wave film over the polarizing film as mentioned above. When the circularly polarizing film is used to visualize a latent image, it is possible to observe the latent image even if the latent image is observed from any angle.

The information recording medium 11 explained above can be manufactured by the following method.

First, a specular reflection layer 2 is formed on one of the main surfaces of the information-recorded substrate 13 by an evaporation method or a sputtering method. Second, the latent image formation layer 3 is formed on the specular reflection layer 2. The latent image formation layer 3 can be formed, for example, by a known coating method such as a printing method including a gravure printing method or a screen-printing method; or a nozzle coating method. Note that the latent image formation layer 3 immediately after the formation thereof does not have a specific crystal structure. The molecules are oriented at random.

Thereafter, the protection layer 14 is formed on the latent image formation layer 3. The protection layer 14 may be formed by a printing method such as a gravure printing method, a screen printing method, an off-set printing method or flexographic printing; or a known coating method such as a nozzle coating method.

Then, a latent image is formed on the latent image formation layer 3 of the information recording medium 11 on which a latent image has not yet been formed. The formation of the latent image on the latent image formation layer 3, in other words, the formation of the oriented portion 3a and the non-oriented portion 3b can be performed by applying both heat and pressure to a surface of the latent image formation layer 3 from the side of the protection layer 14. The latent image can be formed, for example, by using a hot stamp or a thermal head. Alternatively, heating by use of a laser and pressurizing by use of another apparatus may be simultaneously performed. In this manner mentioned above, the information recording medium 11 shown in FIG. 6 can be obtained.

Various types of data including personal data may be recorded on the information recording medium 11 at any step in the manufacturing process mentioned above. For example, after recording data on the information-recorded substrate 13, other films may be formed. Furthermore, after forming all films, data may be recorded on the information-recorded substrate 13 and thereafter, a latent image may formed on the latent image formation layer 3. Furthermore, after forming all films and the latent image, data may be recorded on the information-recorded substrate 13. Alternatively, a part of data may be recorded on the information-recorded substrate 13 before other films are formed, and thereafter, the remaining data may be recorded on the information-recorded substrate 13 in any one of the steps. Data may be recorded on other structural elements other than the information-recorded substrate 13 of the information recording medium 11.

According to the first embodiment explained above, the data recording medium 11 is manufactured by sequentially forming films on the information-recorded substrate 13. However, the information recording medium may be manufactured by another method. According to second to fourth embodiments mentioned below, a member of imparting forgery-preventing characteristic may be used to manufacture the information recording medium.

First, the second embodiment of the present invention, which uses an adhesive-backed sheet as a member of imparting forgery-preventing characteristic, will be explained.

Figure 7:
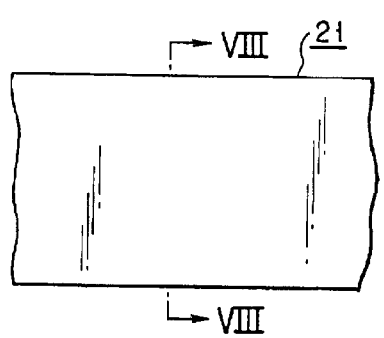
FIG. 7 is a schematic plan view of an adhesive-backed sheet according to a second embodiment of the present invention.
Figure 8:
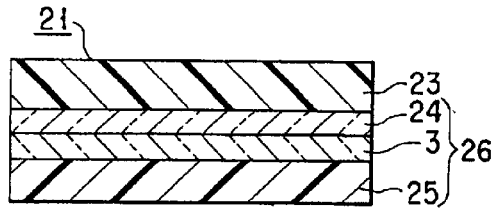
FIG. 8 is a sectional view taken along the line VIII—VIII of the adhesive-backed sheet of FIG. 7.

FIG. 7 is a schematic plan view showing an adhesive-backed sheet according to the second embodiment of the present invention. FIG. 8 is a sectional view taken along the line VIII—VIII of the adhesive-backed sheet shown in FIG. 7.

An adhesive-backed sheet 21 shown in FIGS. 7 and 8 has a ribbon shape. A releasable protection layer 24, a latent image formation layer 3, and an adhesive layer 25 are sequentially laminated on one of the main surfaces of a base layer 23. Note that the releasable protection layer 24, the latent image formation layer 3, and the adhesive layer 25 constitute a heat transfer layer 26.

Figure 9:
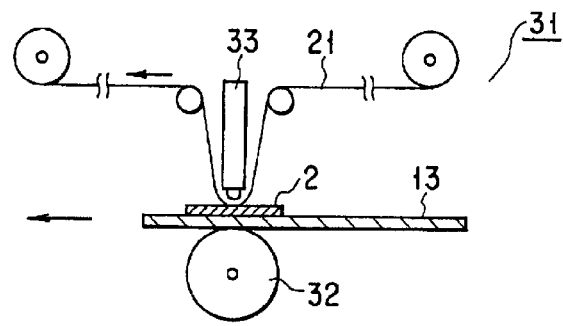
FIG. 9 is a schematic view of an apparatus for use in manufacturing an information recording medium according to the second embodiment of the present invention.

FIG. 9 is a schematic view of an apparatus which can be used in manufacturing an information recording medium according to the second embodiment of the present invention. The apparatus 31 shown in FIG. 9 has a press roll 32 and a thermal head 33. The press roll 32 and the thermal head 33 are arranged with a predetermined gap therebetween. The adhesive-backed sheet 21 and the information-recorded substrate 13 having a specular reflection layer 2 formed thereon are allowed to pass through the gap.

According to the second embodiment, the information recording medium is manufactured, for example, by the method mentioned below.

First, the adhesive-backed sheet 21 shown in FIGS. 7 and 8 are prepared. The adhesive-backed sheet 21 can be obtained by sequentially forming the releasable protection layer 24, the latent image formation layer 3, and the adhesive layer 25 on one of main surfaces of the base layer 23. On the other hand, the information-recorded substrate 13 having the specular reflection layer 2 on at least one of the main surfaces thereof is prepared as the light reflective substrate. Next, the light reflective substrate and the adhesive-backed sheet 21 are passed through the gap between the press roll 32 and the thermal head 33 of the apparatus shown in FIG. 9 in such a manner that the specular reflection layer 2 and the adhesive layer 25 come into contact with each other. At that time, while a sufficient pressure is applied to the light reflective substrate and the adhesive-backed sheet 21, the adhesive-backed sheet 21 is heated to a sufficiently high temperature with a predetermined pattern by the thermal head 33. In this manner, the heating portion of the heat transfer layer 26 is transferred from the adhesive-backed sheet 21 onto the specular reflection layer 2 of the light reflective substrate.

FIG. 10 is a schematic sectional view of the structure thus obtained. As shown in FIG. 10, the heat transfer layer 26 is transferred onto the specular reflection layer 2 correspondently with the aforementioned pattern. If the temperature of the hot-press transfer is sufficiently high, a latent image is formed on the latent image formation layer 3 of the heat transfer layer 26. More specifically, the transfer of the latent image formation layer 3 and formation of the latent image are simultaneously performed.

When the temperature of the hot-press transfer is relatively low, only the transfer of the latent image formation layer 3 may be performed without forming a latent image. In this case, after the heat transfer layer 26 is transferred, a latent image may be formed on the latent image formation layer 3.

Note that, in this embodiment, only a heat-pressed portion of the heat transfer layer 26 is transferred as described above. Therefore, in the structure shown in FIG. 4, the transferred pattern of the heat transfer layer 26 generally coincides with that of the oriented portion, whereas the opening portion of the pattern of the heat transfer layer 26 corresponds to the non-oriented portion. The opening portion is preferably filled with a light scattering protection layer 34 as explained below.

FIG. 11 is a schematic plan view showing an information recording medium 11 obtained by further adding the light scattering protection layer 34 to the structure shown in FIG. 10. FIG. 12 is a cross sectional view taken along the line XII—XII of the information recording medium 11 shown in FIG. 11.

As shown in FIGS. 11 and 12, in the case where the light scattering protection layer 34 is provided, the surface of the resultant structure is smoothed. In this case, a latent image can be effectively prevented from being visually observed. Furthermore, since the protection layer 34 has a light scattering characteristic, a latent image can be more effectively prevented from being visually observed. Note that, in the information recording medium 11 shown in FIGS. 11 and 12, the portion of the light scattering protection layer 34 filling the opening portion of the heat transfer layer 26 corresponds to the non-oriented portion.

Next, each of the structural elements of the adhesive-backed sheet 21 shown in FIGS. 7 and 8 and the information recording medium 11 shown in FIGS. 11 and 12 will be explained.

As the base layer 23, use may be made of a synthetic resin film such as polyethylene terephthalate, polyvinyl chloride, polyester, polycarbonate, polymethyl methacrylate or polystyrene; a natural resin film; synthetic paper; paper; a glass plate, or the like. Furthermore, a composite formed by combining them may be used as the base layer 23.

As a material for the releasable protection layer 24, use may be made of a general polymer material whose adhesive force is weaker than the adhesive layer 25 and soluble in water or an organic solvent. Examples of such a polymer material include polyvinyl alcohol, methyl cellulose, ethyl cellulose, cellulose acetate, polystyrene, polyvinyl chloride, saturated straight-chain polyesters, methacrylic resins such as polymethyl methacrylate and polyethyl methacrylate, and copolymers thereof. Examples of the polymer material to be used in the releasable protection layer 24 include acrylic resins, styrene-based resins, silicone-based resins, polyisobutyl-based resins and copolymers thereof.

The releasable protection layer 24 can be formed by, for example, a printing method such as a gravure printing method, an off-set printing method, a screen printing method, or a known coating method such as an bar coating method, gravure method or roll coating method.

As a material of the adhesive layer 25, a general adhesive material may be used. Examples of such an adhesive material include a vinyl chloride/vinyl acetate copolymer; polyester-based polyamides; and adhesive agents such as acrylic resins, butyl rubber based resins, natural rubber based resins, silicone based resins, and polyisobutyl based adhesive agents. If necessary, additives may be added to these adhesive agents. Examples of the additives include coagulating components such as alkyl methacrylate, vinyl ester, acrylnitrile, styrene, and a vinyl monomer; modifying components such as unsaturated carboxylic acid, hydroxyl group containing monomer, and acrylnitrile; polymerizing initiation agents; plasticizers; curing agents; accelerators; and antioxidants.

The adhesive layer 25 may be formed by a printing method such as a gravure printing method, an off-set printing method, or a screen-printing method, or a known coating method such as an bar coating method, gravure method or roll coating method.

As a material of the light scattering protection layer 34, use may be made of, for example, the one which has a structure in which fine particles are dissolved in a general polymer material insoluble in water or an organic solvent. Examples of such a polymer material include polyvinyl alcohol, methyl cellulose, ethyl cellulose, cellulose acetate, polystyrene, polyvinyl chloride, a saturated straight chain polyester, methacylic resins such as polymethyl methacrylate and polyethyl methacrylate, and copolymers thereof. Examples of the polymer material to be used in the light scattering protection layer 34 include acrylic resins, styrene resins, silicone resins, polyisobutyl resins and copolymers thereof. Examples of the fine particles to be used in the light scattering protection layer 34 include fine particles of calcium carbonate, and silica.

The light scattering protection layer 34 can be formed by a printing method such as a gravure printing method, an off-set printing method, or a screen printing method, or a known coating method such as an bar coating method, gravure method or roll coating method.

According to the second embodiment, the adhesive-backed sheet 21 shown in FIGS. 7 and 8 is used in manufacturing the information recording medium 11 shown in FIGS. 11 and 12. An information recording medium 11 analogous to that shown in FIGS. 11 and 12 may be formed by another method. For example, first, an information-recorded substrate 13 having a specular reflection layer 2 on one of the main surfaces thereof is prepared. Second, on the specular reflection layer 2, a latent image formation layer is formed with a predetermined pattern by a gravure printing method, in place of the heat transfer layer 26. Furthermore, the protection layer 34 is formed on the latent image formation layer. Thereafter, hot-press is applied onto the protection layer 34 by a hot stamp to render the latent image formation layer in an oriented state. In this way, the information recording medium 11 analogous to that shown in FIGS. 11 and 12 can be manufactured.

According to the second embodiment, the adhesive-backed sheet 21 does not have the specular reflection layer 2, and the light reflective substrate, in which the specular reflection layer 2 is formed on the information-recorded substrate 13, is used. In contrast, a sheet having the specular reflection layer 2 is used in a third embodiment below.

FIG. 13 is a schematic plan view showing a sheet according to the third embodiment of the present invention. FIG. 14 is a sectional view taken along the line XIV—XIV of the sheet shown in FIG. 13.

A sheet 41 shown in FIGS. 13 and 14 has a laminated structure formed on one of the main surfaces of a base layer 43. The laminated structure is formed by sequentially laminating a specular reflection layer 2, a latent image formation layer 3, and a protection layer 14. The sheet 41 can be obtained, for example, by sequentially laminating the specular reflection layer 2, latent image formation layer 3 and the protection layer 14 on one of the main surfaces of the base layer 43. Note that the base layer 14 is an arbitral structural element and therefore may not be always formed.

In the sheet 41 shown in FIGS. 13 and 14, the base layer 43 has a heat-sealing property. Therefore, by laying the sheet 41 and the information-recorded substrate 13 one on the other in such a manner that the base layer 43 is in contact with the substrate 13 and pressurizing the resultant structure while heating, an information recording medium 11 analogous to that shown in FIG. 6 can be obtained. Note that, when the sheet 41 is used in manufacturing the information recording medium 11, the base layer 43 intervenes between the specular reflection layer 2 and the information recording substrate 13.

It is preferable that the protection layer 14 as that explained in the first embodiment be formed on the latent image formation layer 3. The protection layer 14 thus formed can protect the latent image formation layer 3 from being scratched. Furthermore, the protection layer 14 thus formed effectively prevents visual observation of a latent image through traces, which are formed by heat and pressure applied at the time the latent image is formed on the latent image formation layer 3.

The protection layer 14 may be formed before or after the sheet 41 is adhered onto the information-recorded substrate 13. However, the protection layer 14 is usually formed before the sheet 41 is adhered onto the information-recorded substrate 13.

Now, a fourth embodiment of the present invention will be explained in which a self-adhesive seal (or a self-adhesive sticker) is employed as the member of imparting forgery-preventing characteristic.

Figure 15:
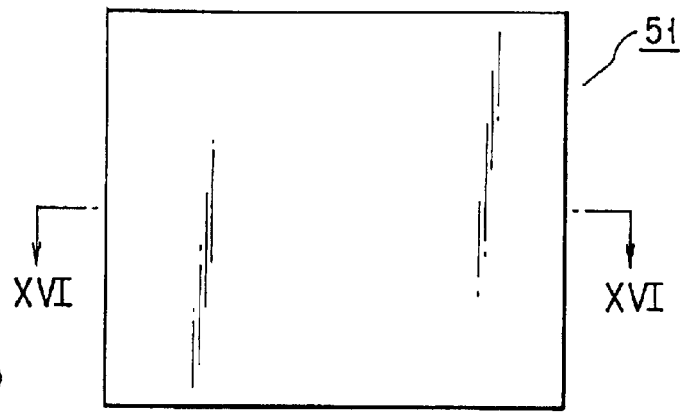
FIG. 15 is a schematic plan view showing a self-adhesive seal according to a fourth embodiment of the present invention.
Figure 16:
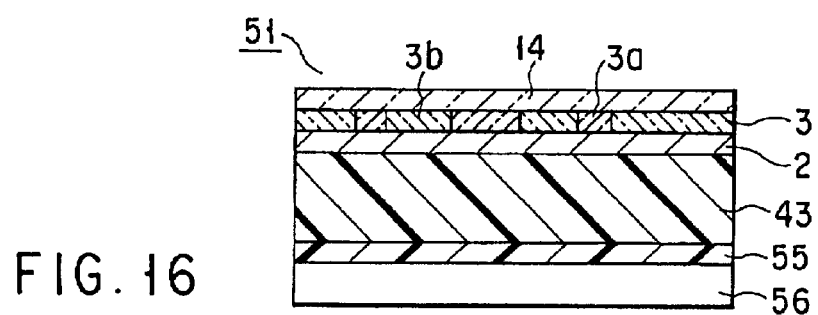
FIG. 16 is a sectional view taken along the line XVI—XVI of the seal shown in FIG. 15.

FIG. 15 is a schematic plan view of a self-adhesive seal according to the fourth embodiment of the present invention. FIG. 16 is a sectional view taken along the line XVI—XVI of the seal shown in FIG. 15.

The self-adhesive seal 51 shown in FIGS. 15 and 16 has a structure in which the specular reflection layer 2, the latent image formation layer 3, and the protection layer 14 are sequentially laminated on one of the main surfaces of the base layer 43, and a sticky layer 55 and a release paper 56 are sequentially laminated on the other main surface of the base layer 43.

Note that the protection layer 14 and the release paper 56 are arbitral structural element in the self-adhesive seal 51. Therefore, they may not always be provided.

In the self-adhesive seal 51 shown in FIGS. 15 and 16, the adhesive layer 55 is formed on the base layer 43. Therefore, by putting the self-adhesive seal 51, from which the release paper 56 is removed, onto the information-recorded substrate 13 in such a manner that the adhesive layer 55 and the substrate 13 come into contact with each other, an information recording medium 11 analogous to that shown in FIG. 6 can be obtained. When the self-adhesive seal 51 is used in manufacturing the information recording medium 11, the base layer 43 and the adhesive layer 55 intervenes between the specular reflection layer 2 and the information-recorded substrate 13.

It is preferable that the protection layer analogous to that explained in the first embodiment is formed on the latent image formation layer 3. The protection layer thus formed can protect the latent image formation layer 3 from being scratched. The protection layer 14 thus formed effectively prevents the visual observation of a latent image through traces formed by heat and pressure applied when a latent image is formed on the latent image formation layer 3.

The protection layer 14 may be formed before or after the self-adhesive seal 51 is put on the information-recorded substrate 13. However, the protection layer 14 is usually formed before the adhesive-backed sheet 51 is put onto the information-recorded substrate 13.

In the self-adhesive seal 51, as the material to be employed in the adhesive layer 55, use may be made of adhesives such as acrylic adhesive agent, butyl rubber-based, natural rubber-based, silicone-based and polyisobutyl-based adhesive agents. If necessary, additives may be added to these adhesive agents. Examples of the additives include coagulating components such as alkyl methacrylate, vinyl ester, acrylnitrile, styrene and a vinyl monomer; and refining components such as unsaturated carboxylic acid, a hydroxyl-group containing monomer, and acrylnitrile; polymerizing initiation agents; plasticizers; curing agents; accelerators; and antioxidants.

Although the specular reflection layer 2 is used as the optical layer in first to fourth embodiments explained above, an OVD may also be used. Note that the OVD is, for example, a hologram or a diffraction grating capable of displaying a stereoscopic image or a special decorative image by use of light interference. Alternatively, the OVD is, for example, a multi-layered film causing a color shift depending upon the observation angle.

The OVD such as a hologram or a diffraction grating is formed of a diffraction structure such as an uneven fine pattern and a band-like pattern using a difference in refractivity. According to these OVDs, due to light interference and diffraction, an inherent image is emerged or a color shift is produced in accordance with the observation angle.

On the other hand, an OVD such as a multi-layered thin film has a laminated structure formed by laminating ceramic layers and metal layers different in optical characteristics into multi layers. The multi-layer film uses an optical interference which varies depending upon the optical characteristics of materials of the layers and the thickness of each layer. More specifically, the multi-layered film has a characteristic which reflects or transmits a light component within a specific range of wavelength. Due the characteristic, a color shift occurs depending upon the observation angle.

These OVDs have a specific feature capable of displaying a stereoscopic image and causing a color shift as explained above, so that it has an excellent decorative effect. The OVDs are therefore employed in general printing matters including wrapping materials, picture books and catalogs.

Note that advanced techniques are required for manufacturing these OVDs. For example, a relief-type hologram is formed as follows. To form the relief-type hologram, a relief-type master hologram with uneven-form fine patterns thereon is first prepared by an optical picture-taking. Second, the uneven fine patterns are replicated from the master hologram by electroplating to form a nickel press die. Thereafter, the press die is pressed against a predetermined layer while heating. In this manner, a large number of relief-type hologram replications can be obtained.

Furthermore, a refractive hologram called a three-dimensional hologram is known. In this hologram, moire fringes are formed in a three-dimensional manner by employing a recording material such as a photosensitive resin and varying three-dimensionally the refractive index of the photosensitive resin. The hologram of this type is called as Lippmann hologram.

Different from the hologram capable of displaying a stereoscopic image, the OVD using a diffraction grating is the one which displays an image called a grating image or a pixel gram by using pixels formed of many types of simple diffraction gratings arranged in a small area. A large number of such OVD are replicated in the same manner as in a relief-type hologram.

As mentioned above, an advanced technique is required for manufacturing the OVD. Therefore, the OVDs have been attached onto information recording mediums such as credit cards, securities, or certificates and used for preventing forgery of the mediums.

In a fifth embodiment of the present invention explained below, the OVD is used instead of the specular reflection layer 2 in the first to fourth embodiments. In this way, more advanced forgery preventing characteristics are realized.

Figure 17:
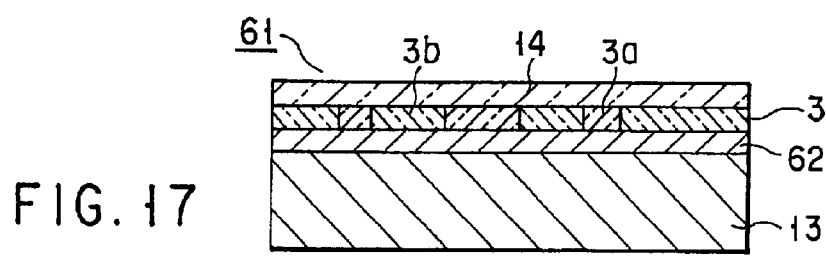
FIG. 17 is a schematic sectional view of an information recording medium according to a fifth embodiment of the present invention.

FIG. 17 is a schematic sectional view of an information recording medium according to the fifth embodiment of the present invention. The information recording medium 61 shown in FIG. 17 has a laminated structure on the information-recorded substrate 13. The laminated structure is formed by sequentially laminating an OVD layer 62, a latent image formation layer 3, and a protection layer 14. Note that the protection layer 14 is an arbitral element, so that it is not always formed.

When the information recording medium 61 is visually observed without using the polarizing film 4, a color shift due to the OVD layer 62 is only observed and the latent image formed on the latent image formation layer 3 cannot be recognized. In contrast, when the information recording medium 61 is visually observed through the polarizing film 4, a latent image formed on the latent image formation layer 3 can be recognized.

The information recording medium 61 shown in FIG. 17 uses the OVD layer 62 having a forgery-preventing characteristic in itself in place of the specular reflection layer 2. Therefore, it is more difficult to forge the information recoding medium.

In the information recording medium 61, the OVD layer 62 may have various structures as mentioned above. This will be explained with reference to FIGS. 18 and 19.

Figure 18:
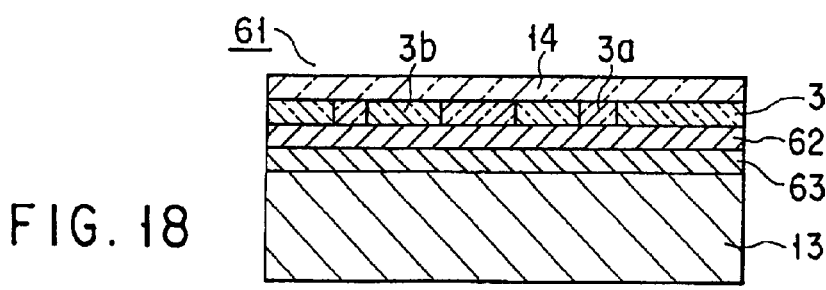
FIG. 18 is a cross-sectional view showing a specific structure of an OVD layer of the information recording medium shown in FIG. 17.
Figure 19:
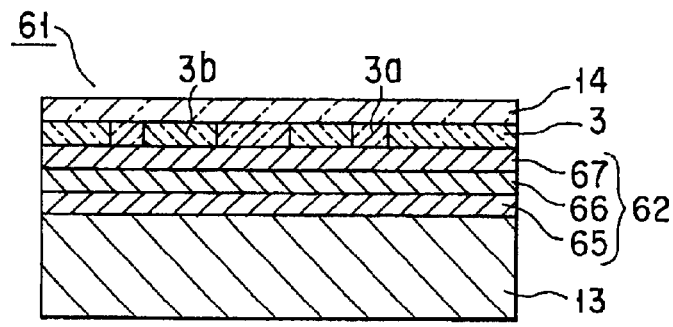
FIG. 19 is a cross-sectional view showing a specific structure of an OVD layer of the information recording medium shown in FIG. 17.

FIGS. 18 and 19 are cross sectional views specifically illustrating the OVD layer 62 of the information recording medium 61 shown in FIG. 17. In the information recording medium 61 shown in FIG. 18, the OVD layer 62 is, for example, a relief-type hologram or a diffraction grating. In this case, a thin film made of a material with a high refractive index or a specular reflection layer 2 made of a metal is usually formed as an OVD effect layer (reflection layer) 63 between the information-recorded substrate 13 and the OVD layer 62. The OVD effect layers 64 thus formed allows interference light from the OVD layer 62 to diffract with a more effective intensity. On the other hand, in the information recording medium 61 shown in FIG. 19, the OVD layer 62 is a multi-layered thin film formed by laminating thin films 65 to 67 mutually different in optical properties.

The OVD layer 62 is not particularly limited as long as it can produce an inherent image or color shift by use of light interference. The OVD layer 62 may have various structures such as a relief-type or three-dimensional-type hologram, diffraction grafting, and multi-layered thin film. In consideration of mass production, the relief-type hologram (diffraction grating) or the multi-layered thin film is preferably used.

The relief type hologram can be mass-produced by a press die made of nickel, as mentioned above. More specifically, the press die is heated and pressed against a predetermined thin film to form an uneven pattern on the thin film. In this manner, a relief type hologram can be obtained. As the thin film used herein, a material, which has a good thermoformability, rarely generates nonuniform press, and gives a bright reproduction image, is preferably used. Examples of such a material include thermoplastic resins such as polycarbonate resin, polystyrene resin, and polyvinyl chloride resin; thermosetting resins such as unsaturated polyester resin, melamine resin and epoxy resin; ultraviolet curing resin or electron radiation curing resin having a free-radical polymerizable unsaturated group, and mixtures thereof. Materials other than mentioned above may be used as long as they have sufficient properties to form the relief-type hologram.

When the OVD layer 62 is the relief-type hologram, an OVD effect layer 63 having a different refractive index from that of the OVD layer 62 is preferably provided between the OVD layer 62 and the information-recorded substrate 13. The OVD effect layer 63 thus formed improves the diffraction efficient. As a result, the latent image can be easily recognized by visual observation through the polarizing film 4.

As a material to be employed in the OVD effect layer 63, use may be made of a high refractive material such as $TiO_2$, $Si_2O_3$, SiO, $Fe_2O_3$, or ZnS; a metal material having a high light refractivity such as Al, Sn, Cr, Ni, Cu or Au. The OVD effect layer 63 may have a single layered structure or a laminated structure made of the aforementioned material(s). When such a material is used, the OVD effect layer 63 may be formed with a thickness of, for example, about 5 to 1000 nm by a known thin-film formation technology such as vacuum evaporation or sputtering.

Materials other than the inorganic materials mentioned above may be used in the OVD effect layer 63 as long as they have a higher refractive index (e.g., refractivity n=1.3 to 1.5) or a higher light reflectivity than that of the polymer material to be used in the OVD layer 62. For example, an organic material, organic/inorganic composite material, or an inorganic filler dispersed in an organic material may be used. When such a material is used, the OVD effect layer 63 is formed with a thickness of, for example, about 0.1 to 10 $\mu$m by a known coating method or printing method such as gravure coating, die coating, or screen printing.

When the OVD layer 62 is a multi-layered thin film as shown in FIG. 19, each of the thin films 65–67 forming the OVD layer 62 may be a metal thin film, a ceramic thin film, or a composite thin film of a metal thin film and a ceramic thin film juxtaposed with each other.

When the multi-layered thin film is formed by laminating thin films different in refractivity, a thin film of a high refractivity and a thin film of low refractivity may be laminated. Alternatively, thin films of a high refractivity and thin films of low refractivity may be alternately laminated. Hence, the multi-layered thin film may have various structures. If the structure of multi-layered thin film is appropriately selected, a multi-layered thin film having desired optical properties can be obtained.

In general, a material having a refractivity of about 2.0 or more is used as the thin film of a high refractivity, whereas a material having a refractivity of about 1.5 or less is used as the thin film of a low refractivity. As a material for the thin film, a ceramic, a metal, an alloy, a polymer material, or the like may be used.

As the ceramic to be used in such a thin film, for example, use may be made of $Sb_2O_3$ (refractivity=3.0: hereinafter, only numerical value is shown), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (2.0), $WO_3$ (2.0), SiO (2.0), $Si_2O_3$ (2.5), $In_2O_3$ (2.0), PbO (2.6), $Ta_2O_3$ (2.4), ZnO (2.1), $ZrO_2$ (2.0), MgO (1.6), $SiO_2$ (1.5), $MgF_2$ (1.4), $CeF_3$ (1.6), $CaF_2$ (1.3–1.4), $AlF_3$ (1.6), $Al_2O_3$ (1.6), GaO (1.7) and the like.

Furthermore, the metal and alloy to be employed in the thin film may comprise Al, Fe, Mg, Zn, Au, Ag, Cr, Ni, Cu, Si and the like.

As the polymer material to be employed in the thin film, use may be made of an organic polymer such as polyethylene (1.51), polypropylene (1.49), polytetrafluoroethylene (1.35), polymethyl methacrylate (1.49), polystyrene (1.60) and the like.

The multi-layered thin film capable of absorbing or reflecting visible light having a specific wavelength can be obtained by selecting at least one of thin films made of a high refractive material and metal thin films having a light transmissivity of 30–60%, and at least one of thin films made of a low refractive material from the thin films made of the aforementioned materials, appropriately setting each thickness of the films selected, and laminating the films alternately. For example, the multi-layered thin film can be formed by alternately laminating a thin film formed of a high-refractivity material such as ZnS, $TiO_2$, $ZrO_2$, $In_2O_3$, SnO, ITO, $CeO_2$, ZnO, $Ta_2O_3$, Al, Fe, Mg, Zn, Au, Ag, Cr, Ni, Cu or Si and a thin film formed of a low-refractivity material such as $MgF_2$, $SiO_2$, $CaF_2$, MgO, and $Al_2O_3$.

Note that the number of thin-film layers is 2 or more, and preferably 2–9. The spectroscopic properties of the multi-layered thin film vary depending upon the number of thin-film layers. The material for forming the multi-layered thin film may be selected based on weather-resistance, chemical-resistance, and adhesiveness in addition to optical properties such as refractivity, reflectivity, and transmissivity.

When a ceramic, metal, alloy, or the like is used in a thin film for forming the multi-layered film, a known method including a physical vapor deposition method such as vacuum evaporation or sputtering, or a chemical vapor deposition method (CVD method) may be employed. When such a method is used, it is possible to control a film thickness, a film formation speed, the number of laminated layers or an optical film thickness (=n·d: where n represents a refractivity and d represents a film thickness).

When the thin films forming the multi-layered thin film are made of a polymer material or the like, use may be made of a known method including a printing method such as gravure printing, off-set printing, or screen printing and a coating method such as bar-coating, a gravure method, or a roll-coating method.

In the information recording medium 61 according to the fifth embodiment explained above, the OVD layer 62 is provided between the information-recorded substrate 13 and the latent image formation layer 3. However, when an optical layer such as the specular reflection layer 2 is formed between the latent image formation layer 3 and the information-recorded substrate 13, the OVD layer 62 may be formed on the latent image formation layer 3. Furthermore, an information recording medium 61 may be manufactured by a method analogous to those explained in the first to fourth embodiments. In this case, an adhesive layer or a base layer intervenes between the latent image formation layer 3 and the information-recorded substrate 13.

Now, Examples of the present invention will be explained.

EXAMPLE 1

The information recording medium 11 shown in FIG. 6 was manufactured by the following method. First, a metal layer of about 60 nm thick was formed as a specular reflection layer 2 by a vacuum evaporation method on one of the main surfaces of a polyethylene terephthalrate (PET) substrate 13 of 50 μm thick. Second, on the specular reflection layer 2, a latent image formation layer 3 was formed by a gravure method using a coating liquid for a latent-image formation layer having a composition shown below. Note that the temperature for drying was 60° C. and coating thickness was 0.5 μm.

Composition of the coating liquid for a latent image formation layer

| | |
|---|---|
| Liquid crystalline polymer: | 20 parts by weight |
| [Chiracoal PLC-7003 manufactured by Asahi Denka Kogyo K.K.] | |
| MEK: | 80 parts by weight |

Thereafter, an FDS medium TP (manufactured by Toyo Ink Manufacturing Co., Ltd.) was print-coated, as an anchor medium, on the latent image formation layer 3 with a thickness of about 1 μm by an off-set printing method. Further, on the resultant structure, matte OP vanish 3H (manufactured by T & K Toka) was print-coated with a thickness of about 2 μm by an offset printing method. As a result, a protection layer 14 was formed.

The entire latent image formation layer 3 of the information recording medium 11 manufactured in the aforementioned method was in a nonorientation state. This means that a latent image was not formed in the latent image formation layer 3. Thus, the latent image was formed in the latent image formation layer 3 of the information recording medium 11 by the following method. To be more specific, heat and pressure were applied to the latent image formation layer 3 by a hot stamp from the side of the protection layer 14 of the information recording medium 11, thereby forming an oriented portion 3a on the latent image formation layer 3 in a predetermined pattern. Note that the heating temperature of the hot stamp was set at 120° C., and the heat/pressure was applied for 0.2 seconds.

When the information recording medium 11 having a latent image thus formed was visually observed, the latent image could not be recognized and the medium 11 looked as a mere metal-deposited medium. In contrast, when the information recording medium 11 was visually observed through a polarizing film 4, a latent image was visually observed as a clear image.

EXAMPLE 2

An information recording medium 11 was manufactured in the same manner as Example 1 except that a latent image was formed by thermal head printing in place of hot stamping. When the information recording medium 11 having a latent image thus formed was visually observed, the latent image could not be recognized and the medium 11 looked as a mere metal deposited medium. In contrast, when the information recording medium 11 was observed through a circularly polarizing film 4, the latent image was clearly observed as a visible image regardless of observation angle. In this example, since the latent image was formed by thermal head printing, any pattern of the latent image could be formed.

EXAMPLE 3

The adhesive-backed sheet 21 shown in FIGS. 7 and 8 was manufactured by the following method. An information recording medium 11 shown in FIGS. 11 and 12 was manufactured by using the sheet 21.

A releasable protection layer 24 of about 1.0 μm thick was formed on one of the major surfaces of a transparent PET base 23 of 12 μm thick by a gravure method using a coating liquid for a releasable protection layer having the composition shown below.

Composition of the coating liquid for releasable protection layer

| | |
|---|---|
| Acrylic resin: | 20 parts by weight |
| [BR-80 manufactured by Mitsubishi Rayon Co., Ltd.] | |
| Toluene: | 40 parts by weight |
| MEK: | 35 parts by weight |
| Ethyl acetate: | 5 parts by weight |

Next, on the releasable protection layer 24, a latent image formation layer 3 was formed by a gravure method using a coating liquid for a latent image formation layer having the composition shown below. The temperature for drying was 60° C. and the coating thickness was 0.5 μm.

Composition of the coating liquid for a latent image formation layer

| | |
|---|---|
| liquid crystalline polymer: | 20 parts by weight |
| [Kiracol PLC-7003 manufactured by Asahi Denka Kogyo K.K.] | |
| MEK: | 80 parts by weight |

Thereafter, on the latent image formation layer 3, an adhesive layer 25 of 2 μm thick was formed by a gravure method using a coating liquid for an adhesive layer having the composition shown below. The adhesive-backed sheet 21 was formed as mentioned above.

Composition for the coating liquid for an adhesive layer

| | |
|---|---|
| Vinyl chloride/vinyl acetate copolymer: | 30 parts by weight |
| Polyester resin: | 20 parts by weight |
| MEK: | 50 parts by weight |
| Toluene: | 50 parts by weight |

The adhesive-backed sheet 21 was formed on the one hand and a specular reflection layer 2 made of Al was formed on a part of one main surface of a white PET substrate 13 having a thickness of 188 μm, on the other hand. Next, a heat transfer layer 26 constituted by the releasable protection layer 24, the latent image formation layer 3 and the adhesive layer 25 was transferred onto the specular reflection layer 2 in a predetermined pattern from the adhesive-backed sheet 21 by an apparatus 31 shown in FIG. 9. As a result, the structure shown in FIG. 10 was obtained. Note that the heating temperature by the thermal head 33 was 120° C. and the heat/pressure was applied for 0.2 seconds. The entire heat transfer layer 26 on the specular reflection layer 2 was in an orientation state and had a latent image formed thereon.

Next, an FDS medium TP (manufactured by Toyo Ink Manufacturing Co., Ltd.) was print-coated, as an anchor medium, on the specular reflection layer 2 with a thickness of about 1 μm by an off-set printing method. Further, on the resultant structure, matte OP vanish 3H (manufactured by T & K Toka) was print-coated with a thickness of about 2 μm to obtain a light-scattering protection layer 14 of about 3 μm. In the way, the information recording medium 11 shown in FIGS. 11 and 12 was manufactured.

When the information recording medium 11 was visually observed, a latent image was not recognized and the medium 11 looked as a mere medium with a light-reflective seal partly provided on the surface. In contrast, when the information recording medium 11 was visually observed through the polarizing film 4, the latent image was clearly observed as a visible image.

EXAMPLE 4

The self-adhesive seal 51 shown in FIGS. 15 and 16 was manufactured by the following method.

First, a metal film of about 60 nm thick was formed as a specular reflection layer 2 on one of the main surfaces of a PET base 43 of 50 μm thick by a vacuum evaporation method. Second, on the specular reflection layer 2, a latent image formation layer 3 was formed by a gravure method using a coating liquid for a latent image formation layer having the composition shown below. Note that the temperature for drying was 60° C. and the coating thickness was 0.5 μm.

Composition of a coating liquid for a latent image formation layer

| | |
|---|---|
| Liquid crystalline polymer: [Kiracol PLC-7003 manufactured by Asahi Denka Kogyo K.K.] | 20 parts by weight |
| MEK: | 80 parts by weight |

Thereafter, on the latent image formation layer 3, an FDS medium TP (manufactured by Toyo Ink Manufacturing Co., Ltd.) was print-coated as an anchor medium with a thickness of about 1 μm by an off-set printing method. Further, on the resultant structure, matte OP vanish 3H (manufactured by T & K Toka) was print-coated as a top coating vanish with a thickness of about 2 μm to obtain a light-scattering protection layer 14 of about 3 μm. Subsequently, an adhesive layer 55 was formed on the other surface of the PET base 43.

The entire latent image formation layer 3 of the self-adhesive seal 51 manufactured in the method mentioned above was in a nonorientation state. This means that a latent image was not formed on the latent image formation layer 3. Thus, a latent image was formed on the latent image formation layer 3 of the self-adhesive seal 51 by the following method. More specifically, heat/pressure was applied by a hot stamp to the latent image formation layer at a side of the protection layer 14 of the self-adhesive seal 51, thereby forming an oriented portion 3a on the latent image formation layer 3 in a predetermined pattern. The heating temperature by the hot stamp was set at 120° C. and heat/pressure was applied for 0.2 seconds.

When the self-adhesive seal 51 having the latent image thus formed was visually observed, the latent image was not recognized and the seal 51 looked as a mere metal-deposited self-adhesive seal. In contrast, when the self-adhesive seal 51 was visually observed through a polarizing filter 4, a latent image was clearly observed as a visible image.

EXAMPLE 5

An self-adhesive seal 51 was manufactured in the same manner as in Example 4 except that a latent image was formed by thermal head printing in place of a hot stamp. When the self-adhesive seal 51 having the latent image formed thereon was visually observed, the latent image was not recognized and the seal 51 looked as a mere metal deposited self-adhesive seal. In contrast, when the self-adhesive seal 51 was visually observed through a circularly polarizing film 4, the latent image was clearly observed as a visible image regardless of observation angle. In this Example, since the latent image was formed by thermal head printing, any pattern of the latent image could be formed.

EXAMPLE 6

Figure 20:
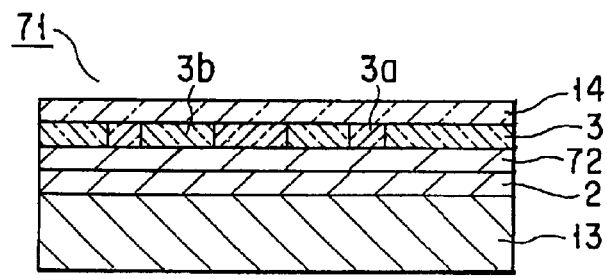
FIG. 20 is a schematic sectional view of an information recording medium according to Example 6 of the present invention.

FIG. 20 is a schematic sectional view of an information recording medium 71 according to Example 6 of the present invention. The information recording medium 71 was manufactured by the following method.

An Al thin film of 60 nm thick was formed as a specular reflection layer 2 by an evaporation deposition method on one of the main surfaces of a card substrate 13 made of vinyl chloride and having a thickness of 780 μm. Subsequently, a rainbow hologram pattern 72 was formed by a roll emboss method, i.e., by pressing a stamper of a relief type rainbow hologram heated to 140° C. against the surface of the card substrate 13 having the specular reflection layer 2 formed thereon. That is, an OVD layer was formed on one of the main surfaces of the card substrate 13.

Subsequently, a latent image formation layer 3 was formed on the rainbow hologram pattern 72 by a gravure method using a coating liquid for the latent image formation layer having the composition shown below. Note that the temperature for drying was 80° C. and coating thickness was 1.0 μm.

Composition of a coating liquid for a latent image formation layer

| | |
|---|---|
| Liquid crystalline polymer: [Kiracol PLC-7003 manufactured by Asahi Denka Kogyo K.K.] | 20 parts by weight |
| MEK: | 80 parts by weight |

Thereafter, the coating liquid for protection layer having the composition shown below was coated as a UV curing resin with a thickness of 2.5 μm on the latent image formation layer 3. The coating film was cured by a UV radiation machine to form a protecting film 14.

Composition of a coating liquid for a protection layer

| | |
|---|---|
| Urethane acrylate: | 60 parts by weight |
| Radical polymerization initiator: | 3 parts by weight |
| Methylethyl ketone: | 37 parts by weight |

The entire latent image formation layer 3 of the information recording medium 71 manufactured by the aforementioned method was in a non-orientation state. This means that a latent image was not formed on the latent image formation layer 3. Thus, a latent image was formed on the latent image formation layer 3 of the information recording medium 71 by the following method. To explain more specifically, heat/pressure was applied by a hot stamp to the latent image formation layer at a side of the protection layer 14 of the information recording medium 71, thereby forming an oriented portion 3a on the latent image formation layer with a predetermined pattern. The heating temperature by the hot stamp was set at 120° C. and the heat/pressure was applied for 0.2 seconds. As the hot stamp, a printing board having a projection of a letter string "TOP" formed thereon was used.

The information recording medium 71 having a latent image thus formed was visually observed. However, the latent image was not recognized and the medium 71 looked as a mere OVD medium. In contrast, when the information recording medium 71 was visually observed through a circularly polarizing film 4, the letter string was clearly observed as a visible image.

EXAMPLE 7

Figure 21:
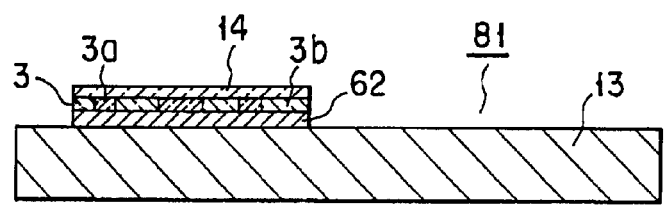
FIG. 21 is a schematic sectional view of an information recording medium according to Example 7 of the present invention.

FIG. 21 is a schematic sectional view of the information recording medium 81 according to a seventh embodiment of the present invention. In this example, the information recording medium 81 was manufactured by the method shown below.

First, as the OVD layer 62, a commercially available hologram transfer foil 62 was transferred by a hot stamp to a part of one main surface of the card substrate 13 made of vinyl chloride and having a thickness of 780 μm. Second, a latent image formation layer 3 was formed on the OVD layer 62 by a gravure method using a coating liquid for the latent image formation layer having the composition shown below. The temperature for drying was 80° C. and the coating thickness was 1.0 μm.

Composition of the coating liquid for a latent image formation layer

| | |
|---|---|
| Liquid crystalline polymer: | 20 parts by weight |
| [Kiracoal PLC-7003 manufactured by Asahi Denka Kogyo K.K.] | |
| MEK: | 80 parts by weight |

Thereafter, a coating liquid for the protection layer having the composition shown below was coated as a UV curing resin on the latent image formation layer 3 with a thickness of 2.5 μm. The coating film was further cured by a UV radiation machine to form a protecting film 14.

Composition of a coating liquid for a protection layer

| | |
|---|---|
| Urethane acrylate: | 60 parts by weight |
| Radical polymerization initiator: | 3 parts by weight |
| Methylethyl ketone: | 37 parts by weight |

The entire latent image formation layer 3 of the information recording medium 81 manufactured by the aforementioned method was in a non-orientation state. This means that a latent image was not formed on the latent image formation layer 3. Thus, a latent image was formed on the latent image formation layer 3 of the information recording medium 81 by the following method. To explain more specifically, heat/pressure was applied by a hot stamp to the latent image formation layer 3 at a side close to the protection layer 14 of the information recording medium 81, thereby forming an oriented portion 3a on the latent image formation layer 3 in a predetermined pattern. The heating temperature by the hot stamp was set at 120° C. and the heat/pressure was applied for 0.2 seconds. As the hot stamp, a printing board having a projection of a letter string "TOP" formed thereon was used.

The information recording medium 81 having a latent image thus formed was visually observed. However, the latent image was not recognized and the medium 81 looked as a mere OVD medium. In contrast, when the information recording medium 81 was visually observed through a circularly polarizing film 4, the letter string was clearly observed as a visible image.

Examples 1–7 demonstrate that extremely high forgery-preventing characteristic can be attained by using a liquid crystalline polymer material. In other words, the latent image which cannot be visually recognized by a simple observation but clearly observed as an extremely visible image through a polarizing film can be easily formed in a desirable pattern.

In contrast, when a liquid crystalline polymer material is not used, all of these effects are not always obtained. For example, when a thin film formed of a polymeric material such as polypropylene, polyethylene, polystyrene or polyester is used as the latent image formation layer 3, a latent image may be formed by scratching or scrubbing a surface of the thin film with a brush, sandpaper, or sandblast.

Furthermore, the latent image formation layer 3 may be formed by pulverizing the thin film in an orientation state into small pieces, dispersing the small pieces into a polymer resin such as polyester or acryl and applying the dispersion solution thus obtained. However, the pattern of the latent image obtained is generally random. This means that, by this method, formation of a latent image with a predetermined patter is difficult.

Examples 8 to 10 are concerned with a method of attaining forgery-preventing characteristics without using the liquid crystalline polymer material.

EXAMPLE 8

An Al light reflection layer of about 60 nm thick was formed by a vacuum evaporation method on one of the main surfaces of a polypropylene sheet of 50 μm thick. A surface of the light reflection layer was scrubbed by a nylon brush in a single direction. In this manner, the entire surface was polarized.

Subsequently, a part of the surface of the light reflection layer was masked with an acrylic resin by a screen-printing method. Furthermore, the surface of the light reflection layer was scrubbed by a nylon brush in the direction perpendicular to the direction mentioned above. As a result, the exposed portion of the surface of the light reflection layer lost the polarization characteristic. In this way, a latent image was formed on the surface of the light reflection layer. Thereafter, an acrylic resin was removed from the sheet to thereby obtain a sheet having a forgery-preventing characteristic.

When the sheet thus manufactured was visually observed, a latent image was not recognized and the sheet looked as a mere metal deposited sheet. In contrast, when the sheet was visually observed through a polarizing film, the latent image was clearly observed as a visible image.

EXAMPLE 9

The sheet having a forgery-preventing characteristic formed in Example 8 was laminated on one of the main surfaces of a PET film of 100 μm thick in such a manner that its light reflection layer was in contact with the PET film. Then, an ultraviolet curing ink was coated (applied) to the surface of the light reflection layer having a latent image formed thereon by off-set printing. The coated (applied) film was cured by a UV lamp to form a protection film. The information recording medium was manufactured in this manner.

When the medium thus manufactured was visually observed, the latent image was not recognized and the medium looked as a mere metal deposited medium. In contrast, when the medium was visually observed through a circularly polarizing film, the latent image was observed as a visible image.

EXAMPLE 10

Figure 22:
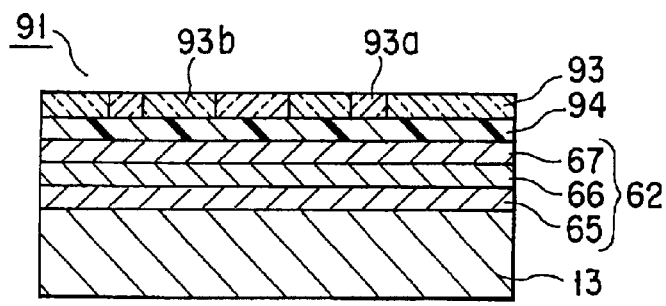
FIG. 22 is a schematic sectional view of a information recording medium according to Example 10 of the present invention.

FIG. 22 is a schematic sectional view of an information recording medium 91 according to Example 10. In this example, the information recording medium 91 was manufactured by the method shown below.

First, an Al film 65, SiO₂ film 66, and an Al film 67 were sequentially formed on one of the main surfaces of the card substrate 13 having a thickness of 780 μm and made of vinyl chloride by a vacuum evaporation method. As a result, a multi-layered thin film 62 was obtained. Note that the thicknesses of the Al film 65, SiO₂ film 65 and the Al film 67 are 70 nm, 580 nm, and 20 nm, respectively.

On the other hand, the letter string "TOP" was formed as a latent image by a rubbing method on one of the main surfaces of polypropylene film 93 of 100 μm thick, which is formed by a protrusion molding method. More specifically, an oriented portion 93a and a non-oriented portion 93b were formed in the polypropylene film 93. Subsequently, a heat sensitive adhesive layer 94 of 2 μm thick was formed by a gravure method using an adhesive-layer coating liquid having the composition shown below on the rear surface with respect to the surface of the film 93 having the latent image formed thereon.

Composition of the adhesion-layer coating liquid

| Olefin-based heat sensitive adhesive: | 15 parts by weight |
| Toluene: | 85 parts by weight |

Furthermore, the film 93 and the card substrate 13 were put one on the other in such a manner that the multi-layered thin film 62 was in contact with the adhesion layer 94. The resultant structure was heated to 80° C. while pressurizing it, to adhere them. In the manner mentioned, the information recording medium 91 was obtained.

When the information recording medium 91 was visually observed, a latent image was not visually recognized and the medium 91 looked as a mere OVD medium. In contrast, when the medium 91 was visually observed through a circularly polarizing film, the latent image was visually observed as a visible image.

As explained in the above, in the present invention, an oriented portion and a non-oriented portion are formed in the latent image formation layer. These portions form a latent image. The latent image can not be recognized under direct visual observation, but can be recognized under visual observation through a polarizing member. More specifically, according to the present invention, the visualization and non-visualization of the latent image can be performed repeatedly. In addition, discrimination of a medium between a genuine one and a counterfeit is easily performed without using a large-scale apparatus for visualizing the latent image.

According to the present invention, the oriented portion and non-oriented portion of the latent image formation layer are made of a liquid crystalline polymer material. It is therefore possible to easily form a complicated latent image having a sufficient resistance.

Furthermore, in the present invention, the oriented portion and non-oriented portion are made of the liquid crystalline polymer material. It is therefore possible to form a latent image formation layer extremely thin. Hence, the forgery preventing technique of the present invention can be applied to any types of information recording mediums. Simultaneously, forgery-preventing characteristic can be imparted to an information recording medium in various ways.

More specifically, according to the present invention, there is provided a forgery-preventing technique which is capable of repeating the visualization and nonvisualization of a latent image, forming a complicated latent image having a sufficient resistance, and easily discriminating a medium between a genuine one and a counterfeit, and which does not require a large apparatus for visualizing the latent image. Furthermore, according to the present invention, there is provided a laminated composite capable of being used in the forgery-preventing technique, an information recording medium having a forgery-preventing characteristic imparted thereto by such a forgery-preventing technique, and a member of imparting the forgery-preventing characteristic to an information recording medium by using such a forgery-preventing technique.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A credit card, comprising:
   a light reflective substrate with a light reflective surface; and
   a latent image formation layer, the latent image formation layer containing a liquid crystalline polymer material and provided on the light reflective surface,
   wherein said latent image formation layer comprises at least one oriented portion in which chains of the liquid crystalline polymer material are orientationally arranged in a single direction substantially parallel to a major surface of the latent image formation layer, and at least one non-oriented portion in which an orientation degree of the chains of the liquid crystalline polymer material is lower than an orientation degree of the chains in the oriented portion,
   wherein said at least one oriented portion and said at least one non-oriented portion constitute a latent image which is unrecognizable by a direct visual observation of the credit card, and
   wherein said credit card is configured to visualize the latent image by arranging a polarizing member at an observer side close to the latent image formation layer.

2. The credit card according to claim 1, wherein said liquid crystalline polymer material is a thermotropic liquid crystalline polymer material.

3. The credit card according to claim 1, wherein said light reflective substrate comprises a laminated structure of an information-recorded substrate and an optical layer facing the latent image formation layer and having a light reflectivity.

4. The credit card according to claim 3, wherein said optical layer is a specular reflection layer.

5. The credit card according to claim 4, further comprising an OVD layer either on the latent image formation layer or between the specular reflection layer and the latent image formation layer.

6. The credit card according to claim 3, wherein said optical layer is an OVD layer.

7. The credit card according to claim 1, further comprising a protection layer, which has a light transmissivity and protects the latent image formation layer, on the latent image formation layer.

8. The credit card according to claim 7, wherein said protection layer has a light scattering property.

9. The credit card according to claim 3, wherein said light reflective substrate further comprises a base layer between the information-recorded substrate and the optical layer.

10. The credit card according to claim 9, wherein said base layer is an adhesive layer.

11. The credit card according to claim 9, further comprising a sticky layer between said information-recorded substrate and said base layer.

12. The credit card according to claim 1, wherein said polarizing member is a circularly polarizing member.

13. A member imparting a forgery-preventing characteristics, comprising:
a base layer;
an optical layer provided on one of major surfaces of the base layer and having a light reflectivity; and
a latent image formation layer, the latent image formation layer containing a liquid crystalline polymer material and provided on the optical layer,
wherein said latent image formation layer comprises at least one oriented portion in which chains of the liquid crystalline polymer material are orientationally arranged in a single direction substantially parallel to a major surface of the latent image formation layer, and at least one non-oriented portion in which an orientation degree of the chains of the liquid crystalline polymer material is lower than an orientation degree of the chains in the oriented portion,
wherein said at least one oriented portion and said at least one non-oriented portion constitute a latent image which is unrecognizable by a direct visual observation of the member imparting the forgery-preventing characteristic, and
wherein said member imparting a forgery-preventing characteristic is configured to visualize the latent image by arranging a polarizing member at an observer side close to the latent image formation layer.

14. The member according to claim 13, wherein said liquid crystalline polymer material is a thermotropic liquid crystalline polymer material.

15. The member according to claim 13, wherein said optical layer is a specular reflection layer.

16. The member according to claim 15, further comprising an OVD layer either on the latent image formation layer or between the specular reflection layer and the latent image formation layer.

17. The member according to claim 13, wherein said optical layer is an OVD layer.

18. The member according to claim 13, further comprising a protection layer, which has a light transmissivity and protects the latent image formation layer, on the latent image formation layer.

19. The member according to claim 18, wherein said protection layer has a light scattering property.

20. The member according to claim 13, wherein said base layer is an adhesive layer.

21. The member according to claim 13, further comprising a sticky layer on said base layer.

22. The member according to claim 13, further comprising a release layer releasably provided on the base layer.

23. The member according to claim 13, wherein said polarizing member is a circularly polarizing member.

24. A credit card, comprising:
a light reflective substrate with a light reflective surface; and
a patterned latent image formation layer, the patterned latent image formation layer containing a liquid crystalline polymer material and provided on the light reflective surface,
wherein chains of the liquid crystalline polymer material are orientationally arranged in a single direction substantially parallel to a major surface of the patterned latent image formation layer,
wherein said patterned latent image formation layer and an opening portion of the patterned latent image formation layer constitute a latent image which is unrecognizable by a direct visual observation of the credit card, and
wherein said credit card is configured to visualize the latent image by arranging a polarizing member at an observer side close to the patterned latent image formation layer.

25. A member imparting a forgery-preventing characteristics, comprising:
a base layer;
an optical layer provided on one of major surfaces of the base layer and having a light reflectivity; and
a patterned latent image formation layer, the latent image formation layer containing a liquid crystalline polymer material and provided on the optical layer,
wherein chains of the liquid crystalline polymer material are orientationally arranged in a single direction substantially parallel to a major surface of the patterned latent image formation layer,
wherein said patterned latent image formation layer and an opening portion of the patterned latent image formation layer constitute a latent image which is unrecognizable by a direct visual observation of the member imparting the forgery-preventing characteristic, and
wherein the member imparting a forgery-preventing characteristic is configured to visualize the latent image by arranging a polarizing member at an observer side close to the patterned latent image formation layer.

26. A security, comprising:
a light reflective substrate with a light reflective surface; and
a latent image formation layer, the latent image formation layer containing a liquid crystalline polymer material and provided on the light reflective surface,
wherein said latent image formation layer comprises at least one oriented portion in which chains of the liquid crystalline polymer material are orientationally arranged in a single direction substantially parallel to a major surface of the latent image formation layer, and at least one non-oriented portion in which an orientation degree of the chains of the liquid crystalline polymer material is lower than that in the oriented portion, wherein said at least one oriented portion and said at least one non-oriented portion constitute a latent image which is unrecognizable by a direct visual observation of the security, and wherein said security is configured to visualize the latent image by arranging a polarizing member at an observer side close to the latent image formation layer.

27. A security, comprising:

a light reflective substrate with a light reflective surface; and a patterned latent image formation layer, the patterned latent image formation layer containing a liquid crystalline polymer material and provided on the light reflective surface, wherein chains of the liquid crystalline polymer material are orientationally arranged in a single direction substantially parallel to a major surface of the patterned latent image formation layer, wherein said patterned latent image formation layer and an opening portion of the patterned latent image formation layer constitute a latent image which is unrecognizable by a direct visual observation of the security, and wherein said security is configured to visualize the latent image by arranging a polarizing member at an observer side close to the patterned latent image formation layer.

28. A certificate, comprising:

a light reflective substrate with a light reflective surface, and a latent image formation layer, the latent image formation layer containing a liquid crystalline polymer material and provided on the light reflective surface, wherein said latent image formation layer comprises at least one oriented portion in which chains of the liquid crystalline polymer material are orientationally arranged in a single direction substantially parallel to a major surface of the latent image formation layer, and at least one non-oriented portion in which an orientation degree of the chains of the liquid crystalline polymer material is lower than that in the oriented portion, wherein said at least one oriented portion and said at least one non-oriented portion constitute a latent image which is unrecognizable by a direct virtual observation of the certificate, and wherein said certificate is configured to visualize the latent image by arranging a polarizing member at an observer side close to the latent image formation layer.

29. A certificate, comprising:

a light reflective substrate with a light reflective surface; and a patterned latent image formation layer, the patterned latent image formation layer containing a liquid crystalline polymer material and provided on the light reflective surface, wherein chains of the liquid crystalline polymer material are orientationally arranged in a single direction substantially parallel to a major surface of the patterned latent image formation layer, wherein said patterned latent image formation layer and an opening portion of the patterned latent image formation layer constitute a latent image which is unrecognizable by a direct visual observation of the certificate, and wherein said certificate is configured to visualize the latent image by arranging a polarizing member at an observer side close to the patterned latent image formation layer.

* * * * *

UNITED STATES PATENT AND TRADEMARK OFFICE
CERTIFICATE OF CORRECTION

PATENT NO. : 6,955,839 B2
APPLICATION NO. : 09/986913
DATED : October 18, 2005
INVENTOR(S) : Satoshi Gocho et al.

It is certified that error appears in the above-identified patent and that said Letters Patent is hereby corrected as shown below:

Column 27, Line 31, delete "characteristics," and insert - - characteristic, - - therefor.
Column 28, Line 37, delete "characteristics," and insert - - characteristic, - - therefor.
Column 30, Line 11, delete "virtual" and insert - - visual - - therefor.

Signed and Sealed this

Twenty-second Day of August, 2006

JON W. DUDAS
*Director of the United States Patent and Trademark Office*